US011130447B2

(12) United States Patent
Li

(10) Patent No.: US 11,130,447 B2
(45) Date of Patent: Sep. 28, 2021

(54) VEHICLE REAR-VIEW MIRROR AND METHOD FOR CONTROLLING THE SAME, CONTROL SYSTEM OF THE VEHICLE REAR-VIEW MIRROR

(71) Applicants: BOE TECHNOLOGY GROUP CO., LTD., Beijing (CN); CHENGDU BOE OPTOELECTRONICS TECHNOLOGY CO., LTD., Sichuan (CN)

(72) Inventor: Kun Li, Beijing (CN)

(73) Assignees: BOE TECHNOLOGY GROUP CO., LTD., Beijing (CN); CHENGDU BOE OPTOELECTRONICS TECHNOLOGY CO., LTD., Sichuan (CN)

( * ) Notice: Subject to any disclaimer, the term of this patent is extended or adjusted under 35 U.S.C. 154(b) by 170 days.

(21) Appl. No.: 16/224,876

(22) Filed: Dec. 19, 2018

(65) Prior Publication Data
US 2019/0291645 A1 Sep. 26, 2019

(30) Foreign Application Priority Data
Mar. 22, 2018 (CN) .......................... 201810239744.7

(51) Int. Cl.
*G06F 1/16* (2006.01)
*B60R 1/12* (2006.01)
*B60R 1/062* (2006.01)

(52) U.S. Cl.
CPC ................ *B60R 1/12* (2013.01); *B60R 1/062* (2013.01); *G06F 1/1652* (2013.01);
(Continued)

(58) Field of Classification Search
CPC .. B60R 1/12; B60R 1/062; B60R 1/00; B60R 1/025; B60R 2001/1215;
(Continued)

(56) References Cited

U.S. PATENT DOCUMENTS 5,052,792 A    10/1991  McDonough
2003/0086192 A1*  5/2003  Abel ........................ B60R 1/08
                                                       359/883

(Continued)

FOREIGN PATENT DOCUMENTS

CN    104136276 A    11/2014
CN    105259706 A    1/2016
(Continued)

OTHER PUBLICATIONS

Second Office Action for Chinese Application No. 201810239744.7, dated Oct. 29, 2019, 14 Pages.
(Continued)

*Primary Examiner* — Mustak Choudhury
(74) *Attorney, Agent, or Firm* — Brooks Kushman P.C.

(57) ABSTRACT

A vehicle rear-view mirror and a method for control the same and a control system thereof are provided. The method for control the vehicle rear-view mirror includes: detecting a turning state of the vehicle; in the case that the vehicle is turning, controlling the driving mechanism to drive the deformable region of the rear-view panel to deform towards the driving mechanism.

12 Claims, 8 Drawing Sheets

(52) U.S. Cl.
CPC ............... *B60R 2001/1215* (2013.01); *B60R 2001/1253* (2013.01); *B60R 2300/8026* (2013.01)

(58) Field of Classification Search
CPC .... B60R 2001/1253; B60R 2300/8026; B60R 2300/20; B60R 2300/802; G06F 1/1652
See application file for complete search history.

(56) References Cited

U.S. PATENT DOCUMENTS

| | | | |
|---|---|---|---|
| 2005/0200984 A1* | 9/2005 | Browne | B60R 1/08 |
| | | | 359/846 |
| 2014/0285666 A1 | 9/2014 | O'Connell et al. | |
| 2015/0085120 A1* | 3/2015 | Heinemann | B60R 1/00 |
| | | | 348/148 |
| 2016/0167583 A1 | 6/2016 | Schrepfer | |
| 2016/0264054 A1* | 9/2016 | Uken | B60R 1/072 |
| 2017/0192298 A1 | 7/2017 | Xie | |

FOREIGN PATENT DOCUMENTS

| | | |
|---|---|---|
| CN | 105658479 A | 6/2016 |
| WO | 2010008130 A1 | 1/2010 |

OTHER PUBLICATIONS

Yu, Shengjun, "Display Device Technology," Aug. 31, 2014, pp. 237-245, National Defense Industry Press (9 Pages).
First Office Action for Chinese Application No. 201810239744.7, dated Jul. 2, 2019, 13 Pages.

\* cited by examiner

VEHICLE REAR-VIEW MIRROR AND METHOD FOR CONTROLLING THE SAME, CONTROL SYSTEM OF THE VEHICLE REAR-VIEW MIRROR

CROSS-REFERENCE TO RELATED APPLICATION

This application claims priority to Chinese Patent Application No. 201810239744.7 filed on Mar. 22, 2018, which is incorporated herein by reference in its entirety.

TECHNICAL FIELD

The present disclosure relates to display technology, and in particular to a vehicle rear-view mirror and a method for control the same and a control system thereof.

BACKGROUND

With the popularity of automobiles, the driving safety of automobiles has attracted more and more attention. The automobile's rear-view mirror, as an important safety auxiliary device, enables the driver to observe the environment behind the automobile at any time. In the related art, the exterior mirrors of the automobile mostly use the glass specular reflection to provide the driver with the external environment image of the automobile, and the size and shape of the rear-view mirror are fixed, and the image region of the reflective display is fixed accordingly. The peripheral environment image, which the rear-view mirror cannot provide, is a blind vision area for the driver. Because the pedestrian in the blind vision area cannot be seen in time, a traffic accident may be caused.

SUMMARY

A vehicle rear-view mirror is provided in the present disclosure, including a rear-view panel and a driving mechanism, where the rear-view panel includes a flexible base substrate and a flexible specular reflective layer, where at least a portion of the rear-view panel is a deformable region, and the flexible specular reflective layer is arranged on the flexible base substrate;

the driving mechanism is configured to drive the rear-view panel to deform.

Optionally, the rear-view panel further includes a flexible display layer, the flexible specular reflective layer is arranged between the flexible display layer and the flexible base substrate.

Optionally, the flexible display layer is a transparent layer, and the flexible specular reflective layer is configured to reflect an external image.

Optionally, the flexible display layer is configured to display an external image.

Optionally, the rear-view panel further includes a flexible display layer, and the flexible display layer is arranged between the flexible specular reflective layer and the flexible base substrate.

Optionally, the flexible specular reflective layer includes a plurality of reflective units separated apart from each other, and the flexible display layer includes a plurality of pixel units separated apart from each other;

the reflective units of the flexible specular reflective layer shield the pixel units of the flexible display layer, to reflect an external image; or the pixel units of the flexible display layer are arranged at intervals between adjacent reflective units of the flexible specular reflective layer, to display an external image.

Optionally, the rear-view panel further includes a flexible display layer, and the flexible specular reflective layer is a pixel electrode layer of the flexible display layer.

Optionally, the deformable region is arranged at a side of the rear-view panel away from a vehicle, and the driving mechanism is configured to drive the rear-view panel to deform towards the driving mechanism.

A method for controlling the vehicle rear-view mirror hereinabove is further provided in the present disclosure, including:

detecting a turning state of the vehicle;

in the case that the vehicle is turning, controlling the driving mechanism to drive the deformable region of the rear-view panel to deform towards the driving mechanism.

Optionally, prior to the controlling the driving mechanism to drive the deformable region of the rear-view panel to deform towards the driving mechanism, the method further includes: acquiring a turning direction of the vehicle;

the controlling the driving mechanism to drive the deformable region of the rear-view panel to deform towards the driving mechanism further includes:

controlling the driving mechanism of the rear-view mirror corresponding to the turning direction of the vehicle to drive the deformable region of the rear-view panel to deform towards the driving mechanism.

Optionally, the controlling the driving mechanism to drive the deformable region of the rear-view panel to deform towards the driving mechanism further includes:

controlling the driving mechanism to drive the deformable region of the rear-view panel to deform towards the driving mechanism at a predetermined angle or at an angle corresponding to a turning angle of the vehicle.

A method for controlling the vehicle rear-view mirror hereinabove is further provided in the present disclosure, including:

detecting an ambient brightness of a position where the vehicle is located;

in the case that the ambient brightness is smaller than a first predetermined brightness, displaying through the flexible display layer an image of a predetermined region acquired by a camera device.

Optionally, the method further includes:

in the case that the ambient brightness is smaller than a second predetermined brightness, increasing a brightness of the image of the predetermined region acquired by the camera device and displaying the image through the flexible display layer.

Optionally, the method further includes:

detecting a turning state of the vehicle;

in the case that the vehicle is turning, zooming out the image of the predetermined region acquired by the camera device and displaying the image through the flexible display layer.

A control system of the vehicle rear-view mirror hereinabove is further provided in the present disclosure, including:

a first detection circuit, configured to detect a turning state of the vehicle;

a first control circuit configured to, in the case that the first detection circuit detects that the vehicle is turning, control the driving mechanism to drive the deformable region of the rear-view panel to deform towards the driving mechanism.

Optionally, the first detection circuit is further configured to acquire a turning direction of the vehicle;

the first control circuit is further configured to, in the case that the first detection circuit detects that the vehicle is turning, control the driving mechanism of the rear-view mirror corresponding to the turning direction of the vehicle to drive the deformable region of the rear-view panel to deform towards the driving mechanism.

Optionally, the first control circuit is further configured to, in the case that the first detection circuit detects that the vehicle is turning, control the driving mechanism to drive the deformable region of the rear-view panel to deform towards the driving mechanism at a predetermined angle or at an angle corresponding to a turning angle of the vehicle.

A control system of the vehicle rear-view mirror hereinabove is further provided in the present disclosure, including:

a second detection circuit, configured to detect an ambient brightness of a position where the vehicle is located;

a camera device, configured to acquire an image of a predetermined region;

and a second control circuit configured to, in the case that the second detection circuit detects that the ambient brightness is smaller than a first predetermined brightness, display through the flexible display layer the image of the predetermined region acquired by the camera device.

Optionally, the control system further includes an image processing circuit, where the second control circuit is further configured to, in the case that the second detection circuit detects that the ambient brightness is smaller than a second predetermined brightness, control the image processing circuit to increase a brightness of the image of the predetermined region acquired by the camera device and display the image through the flexible display layer.

Optionally, the control system further includes a first detection circuit and an image processing circuit, where the first detection circuit is configured to detect a turning state of the vehicle;

the second control circuit is further configured to, in the case that the first detection circuit detects that the vehicle is turning, control the image processing circuit to zoom out the image of the predetermined region acquired by the camera device and display the image through the flexible display layer.

BRIEF DESCRIPTION OF THE DRAWINGS

The drawings are used to provide a further understanding of the technical solutions of the present disclosure, and constitute a part of the specification, which is used to explain the technical solutions of the present disclosure together with the embodiments of the present disclosure, and does not constitute a limitation of the technical solutions of the present disclosure.

DETAILED DESCRIPTION

The present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

The steps illustrated in the flowchart of the figures may be executed in a computer system such as a set of computer executable instructions. Also, although logical sequences are shown in the flowcharts, in some cases the steps shown or described may be performed in a different order than the ones described herein.

Figure 1:
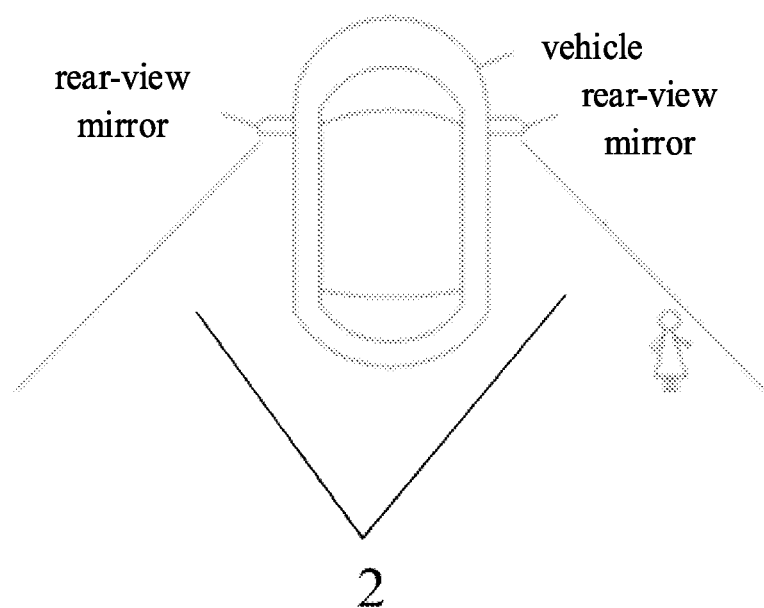
FIG. 1 is a schematic view of an image region within a viewing angle range of a rear-view mirror of a vehicle which is traveling straightly in the related art.
Figure 2:
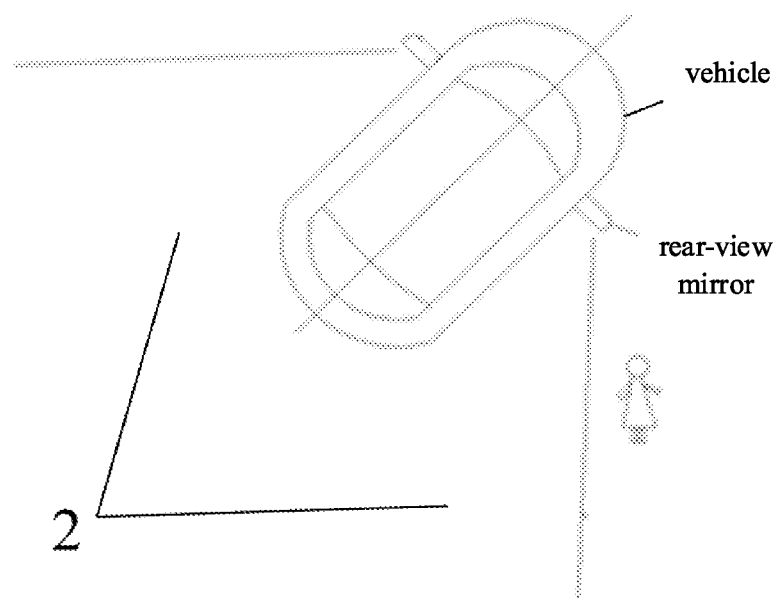
FIG. 2 is a schematic view of an image region within a viewing angle range of a rear-view mirror of a vehicle which is turning in the related art.

FIG. 1 is a schematic view of an image region within a viewing angle range of a rear-view mirror of a vehicle which is traveling straightly in the related art. As shown in FIG. 1, when the vehicle is running straightly, the vehicle rear-view mirror may only display the image in the image region 2 within the display viewing angle range, while the image outside the image region 2 (i.e., the blind vision region) cannot be displayed. When the driver is turning the vehicle, since the obstacles such as the pedestrian or other moving vehicles in the blind vision region may not be observed by the driver, a traffic accident may occur. FIG. 2 is a schematic view of an image region within a viewing angle range of a rear-view mirror of a vehicle which is turning in the related art. As shown in FIG. 2, when the driver is turning the vehicle, since the obstacles such as the pedestrian or other moving vehicles in the blind vision region may not be observed by the driver, a traffic accident may occur.

Figure 3A:
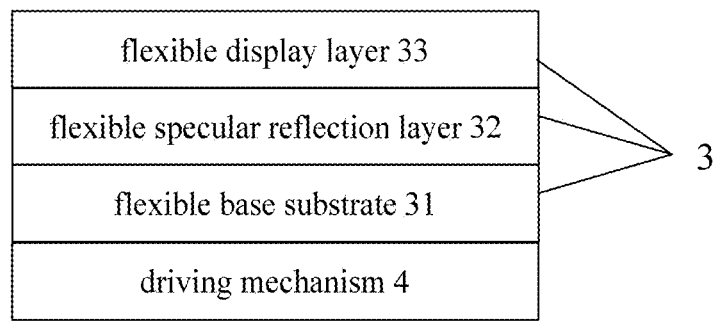
FIG. 3*a* is a schematic view of a vehicle rear-view mirror in some embodiments of the present disclosure.
Figure 3B:
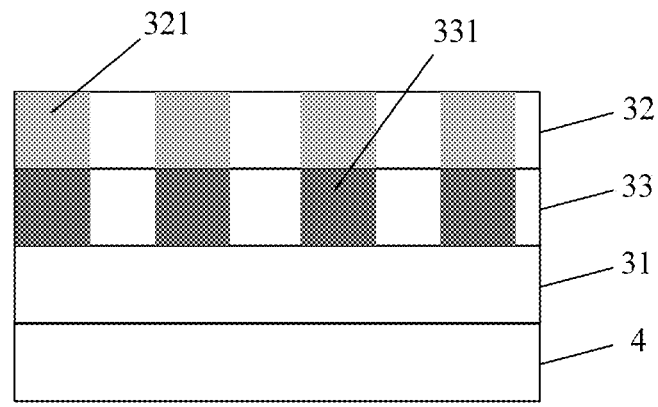
FIG. 3*b* is a schematic view of a vehicle rear-view mirror in some embodiments of the present disclosure.
Figure 3C:
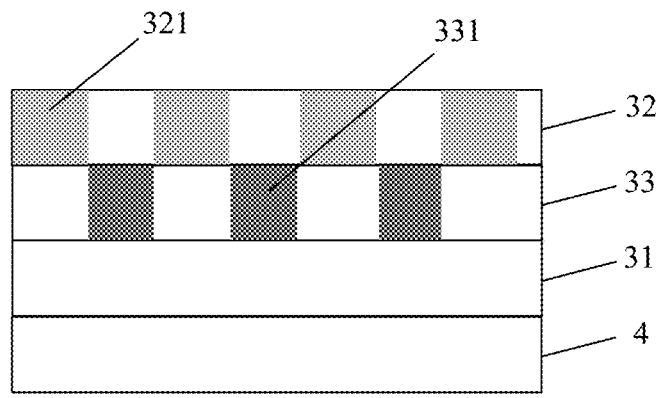
FIG. 3*c* is a schematic view of a vehicle rear-view mirror in some embodiments of the present disclosure.

Referring to FIG. 3, a vehicle rear-view mirror is provided in some embodiments of the present disclosure, which may be one or more of a car, a bicycle, a motorcycle, etc., and the vehicle rear-view mirror includes a rear-view panel 3 and a driving mechanism 4.

The rear-view panel 3 includes a flexible base substrate 31 and a flexible specular reflection layer 32. At least a portion of the rear-view panel 3 is a deformable region, and the flexible specular reflective layer 32 is arranged on the flexible base substrate 31. The driving mechanism 4 is configured to drive the rear-view panel 3 to deform.

In some embodiments of the present disclosure, the vehicle rear-view mirror further includes a flexible display layer 33. The flexible specular reflection layer 32 is arranged between the flexible display layer 33 and the flexible base substrate 31, or the flexible display layer 33 is arranged between the flexible specular reflection layer 32 and the flexible base substrate 31, or the flexible specular reflection layer 32 is a pixel electrode layer of the flexible display layer 33.

The flexible specular reflection layer 32 is configured to reflect an external image. The flexible specular reflection layer 32 may be a reflective film, for example, a thin silver film. In addition, a reflective film may also be directly coated on the flexible base substrate 31 by a coating process to form a specular reflection layer.

When the flexible specular reflection layer 32 is arranged between the flexible display layer 33 and the flexible base substrate 31, the flexible display layer 33 is a transparent flexible display layer, such as a transparent liquid crystal flexible display layer, a transparent electronic paper flexible display layer, or even a transparent organic light emitting diode (OLED) flexible display layer. The materials of the circuit line layer and the like in the flexible display layer are transparent materials, such as indium tin oxide (ITO), nano-silver, graphene and so on. Among them, the transparent electronic paper flexible display layer and the transparent OLED flexible display layer are more suitable for the flexible product manufacturing process.

As shown in FIG. 3a, when the flexible specular reflection layer 32 is arranged between the flexible display layer 33 and the flexible base substrate 31, the flexible display layer 33 is in a transparent state when the specular reflection display is performed, and the flexible specular reflection layer 32 below the flexible display layer 33 may reflect the external image into the user's eyes. When the image display is performed, the flexible display layer 33 is in a non-transparent state, and the image captured by the camera device is displayed.

The flexible display layer 33 may be directly formed on the reflective layer, or a prepared flexible display layer 33 may be attached to the flexible specular reflective layer 32. The flexible specular reflective layer 32 may also be integrated with the flexible display layer 33, thereby reducing the process steps and saving costs.

When the flexible display layer 33 is arranged between the flexible specular reflection layer 32 and the flexible base substrate 31, as shown in FIG. 3b, the reflective units 321 of the flexible specular reflection layer 32 cover the pixel units 331 of the flexible display layer 33 when the mirror display is performed, so as to shield the pixel units 331 of the flexible display layer 33 to reflect the external image. When performing an image display, the reflective units 321 of the flexible specular reflection layer 32 do not cover the pixel units 331 of the flexible display layer 33, and the image captured by the camera device is displayed by the pixel units 331 of the flexible display layer 33.

When the flexible specular reflection layer 32 is the pixel electrode layer of the flexible display layer 33, the pixel electrode of the flexible display layer 33 functions as a reflection layer in addition to driving the display electrodes.

In some embodiments of the present disclosure, the deformable region is arranged at the side of the rear-view panel 3 away from the vehicle.

Figure 4:
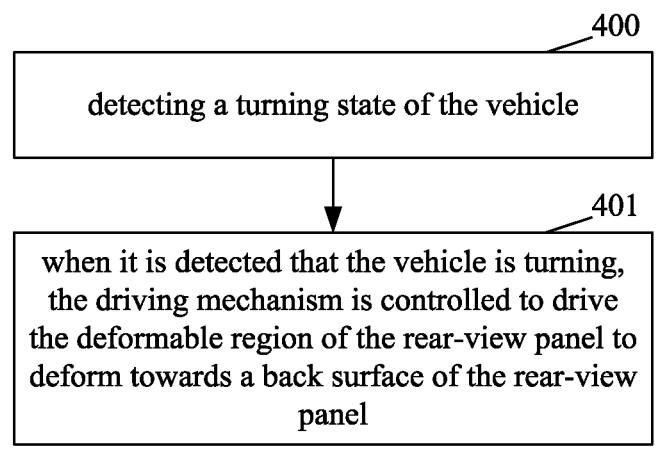
FIG. 4 is a flow chart of a method for controlling a vehicle rear-view mirror in some embodiments of the present disclosure.

Referring to FIG. 4, a method for controlling a vehicle rear-view mirror is further provided in some embodiments of the present disclosure, which is applied to any of the above-described vehicle rear-view mirrors, including:

Step 400: detecting a turning state of the vehicle.

In some embodiments of the present disclosure, a turning direction sensor, such as a gyroscope or the like, may be applied to detect the turning state of the vehicle, that is, to detect whether the vehicle is turning.

Step 401: when it is detected that the vehicle is turning, the driving mechanism is controlled to drive the deformable region of the rear-view panel to deform towards a back surface of the rear-view panel.

According to the embodiments of the present disclosure, a flexible rear-view panel with a mirror display function is used as a rear-view panel of the rear-view mirror, so that when it is detected that the vehicle is turning, the driving mechanism is controlled to drive the deformable region of the rear-view panel to deform towards the back surface of the rear-view panel so as to enlarge the range of the viewing angle of the rear-view mirror (the viewing angle the angle formed by the light beams from both ends of the object at the center of the eye), thereby reducing the possibility of a traffic accident.

In some embodiments of the present disclosure, prior to the controlling the driving mechanism to drive the deformable region of the rear-view panel to deform towards the driving mechanism, the method further includes: acquiring a turning direction of the vehicle. Specifically, the turning direction of the vehicle may be acquired by a turning direction sensor.

After acquiring the turning direction of the vehicle, the driving mechanism is controlled to drive the deformable region of the rear-view panel to deform towards the back surface of the rear-view panel based on the turning direction.

Specifically, the driving mechanism of the rear-view mirror corresponding to the turning direction of the vehicle is controlled to drive the deformable region of the rear-view panel to deform towards the back surface of the rear-view panel.

For example, when the vehicle is turning to the left, the driving mechanism of the left rear-view mirror is controlled to drive the deformable region of the rear-view panel of the left rear-view mirror to deform towards the back surface of the rear-view panel; when the vehicle is turning to the right, the driving mechanism of the right rear-view mirror is controlled to drive the deformable region of the rear-view panel of the right rear-view mirror to deform towards the back surface of the rear-view panel.

In some embodiments of the present disclosure, the angle of deformation of the rear-view panel of the rear-view mirror in the deformable region may be a predetermined angle, or may be the same angle as the turning angle of the vehicle, or may be mapped to the turning angle of the vehicle, as long as the viewing angle after the deformation of the rear-view panel is larger than the viewing angle before the deformation of the rear-view panel. Of course, in order to enable the driver to better know the conditions of the external environment, the larger viewing angle is better. When the angle of deformation of the rear-view panel in the deformable region is larger than a certain predetermined angle, the driver may not know the image corresponding to the deformable region, the angle of deformation of the rear-view panel in the deformable region may be less than a certain predetermined angle.

For example, when the vehicle is turning to the left, the driving mechanism for controlling the left rear-view mirror drives the rear-view panel to deform at a predetermined angle to the back surface thereof or an angle corresponding to the turning angle of the vehicle in the deformable region.

Alternatively, when the vehicle is turning to the right, the driving mechanism for controlling the left rear-view mirror drives the rear-view panel to deform at a predetermined angle to the back surface thereof or an angle corresponding to the turning angle of the vehicle in the deformable region.

In some embodiments of the present disclosure, the turning angle of the vehicle may be acquired by through a turning direction sensor.

In some embodiments of the present disclosure, there are two ways for the rear-view panel to be deformed in the deformable region, i.e., a segmented folding deformation and a continuous circular deformation. In addition, the deformable region may be a part of the rear-view panel or the entire rear-view panel.

Figure 6:
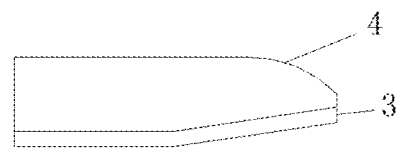
FIG. 6 is a schematic view showing a segmented folding deformation of a rear-view panel of a vehicle rear-view mirror in some embodiments of the present disclosure.

FIG. 6 is a schematic view showing a segmented folding deformation of a rear-view panel of a vehicle rear-view mirror in some embodiments of the present disclosure. As shown in FIG. 6, the deformable region is only inclined at a certain angle. After the deformation, the cross-section of the deformable region is still a straight line, but the deformable region and the non-deformable region form a certain angle, thereby enlarging the image region of the rear-view mirror. When the deformable region is the entire rear-view panel 3, the deformable region after the deformation is inclined at an angle to the deformable region prior to the deformation. Therefore, the angle at which the rear-view panel 3 is deformed may be defined as an angle at which the deformable region is inclined. Of course, the angle at which the deformable region is deformed may be defines in other ways, and the present disclosure is not limited herein.

Figure 7:
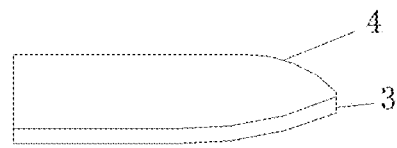
FIG. 7 is a schematic view showing a continuous circular deformation of a rear-view panel of a vehicle rear-view mirror in some embodiments of the present disclosure.
Figure 8:
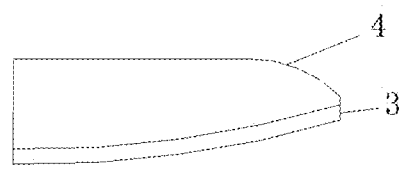
FIG. 8 is a schematic view showing a continuous circular deformation of a rear-view panel of a vehicle rear-view mirror in some embodiments of the present disclosure.

FIG. 7 is a schematic view showing a continuous circular deformation of a rear-view panel of a vehicle rear-view mirror in some embodiments of the present disclosure. FIG. 8 is a schematic view showing a continuous circular deformation of a rear-view panel of a vehicle rear-view mirror in some embodiments of the present disclosure. As shown in FIG. 7 and FIG. 8, the deformable region is deformed in a continuous circular manner, and the deformable region becomes a curved plane after the deformation, and the cross-section of the deformable region is a curve or an arc. In FIG. 7, the deformable region is a part of the rear-view panel 3, and therefore, the two ends of the curve or the arc are at an angle to the non-deformable region, so that the angle of the deformation of the rear-view panel may be defined as the angle between a connection line of the two ends of the curve or the arc and the non-deformable region, or the angle of the deformation of the rear-view panel may be defined as the central angle of the arc. Of course, other ways may be used to define the angle of the deformation of the rear-view panel, and the present disclosure is not limited herein.

In FIG. 8, the deformable region is the entire rear-view panel 3. Therefore, the connection line of the two ends of the curve or the arc is at an angle to the deformable region prior to the deformation, so the angle of the deformation of the rear-view panel 3 may be defined as the angle between the connection line of the two ends of the curve or the arc and the deformable region prior to the deformation, or the angle of the deformation of the rear-view panel may be defined as the central angle of the arc. Of course, other ways may be used to define the angle of the deformation of the rear-view panel, and the present disclosure is not limited herein.

In some embodiments of the present disclosure, the larger the angle of deformation of the rear-view panel 3 is, the larger the image region of the rear-view mirror may be. The angle at which the rear-view panel 3 is deformed may be predetermined, set by the user, set to a fixed value or set according to the turning angle of the vehicle. For example, the deformation angle of the rear-view mirror may be a predetermined function value of the turning angle of the vehicle.

Figure 9:
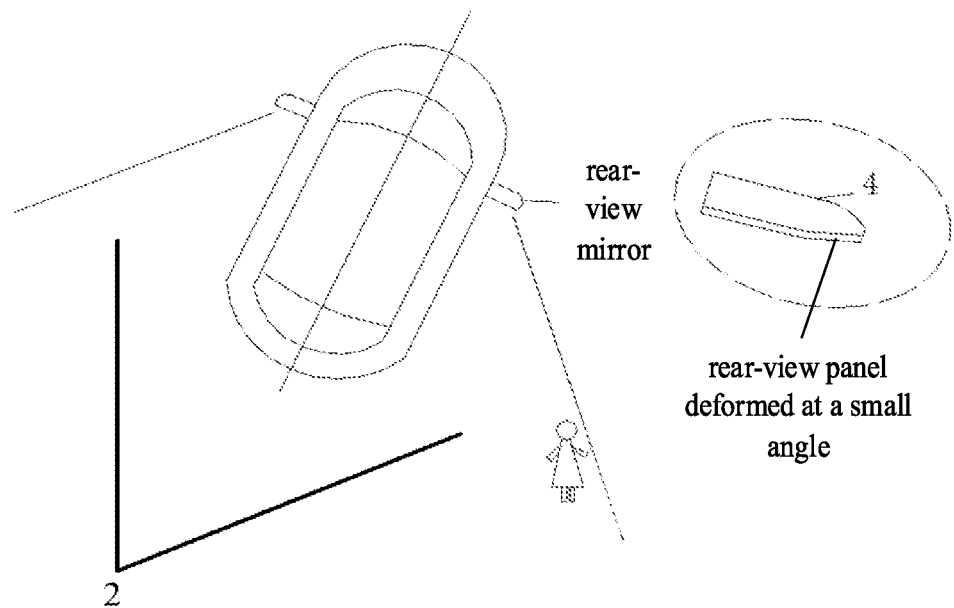
FIG. 9 is a schematic view showing a deformation of a rear-view panel of a vehicle rear-view mirror when a turning angle of the vehicle is small in some embodiments of the present disclosure.

FIG. 9 is a schematic view showing a deformation of a rear-view panel of a vehicle rear-view mirror when a turning angle of the vehicle is small in some embodiments of the present disclosure. As shown in FIG. 9, when the turning angle of the vehicle is small, since the blind vision area of the driver is small, the rear-view panel 3 may compensate for the viewing region of the blind vision area of the driver when the rear-view panel 3 is deformed at a small angle.

Figure 10:
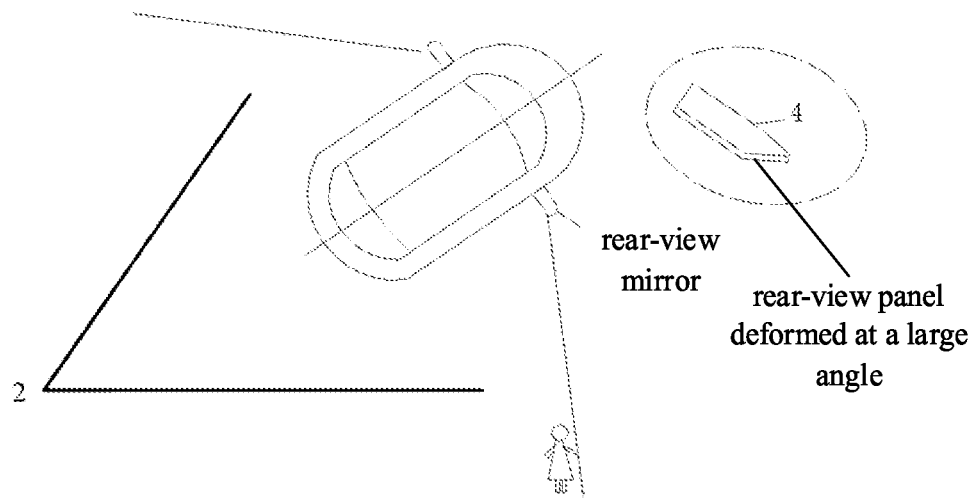
FIG. 10 is a schematic view showing a deformation of a rear-view panel of a vehicle rear-view mirror when a turning angle of the vehicle is large in some embodiments of the present disclosure.

FIG. 10 is a schematic view showing a deformation of a rear-view panel of a vehicle rear-view mirror when a turning angle of the vehicle is large in some embodiments of the present disclosure. As shown in FIG. 10, when the turning angle of the vehicle is large, since the blind vision area of the driver is large, the rear-view panel 3 may be deformed at a large angle to compensate for the viewing region of the blind vision area of the driver.

In some embodiments of the present disclosure, the method further includes:

detecting an ambient brightness of a position where the vehicle is located, and in the case that the ambient brightness is greater than or equal to the first predetermined brightness, controlling the rear-view panel of the rear-view mirror to perform a specular reflection display.

In some embodiments of the present disclosure, the brightness sensor may be used to detect the ambient brightness of the position where the vehicle is located.

Figure 5:
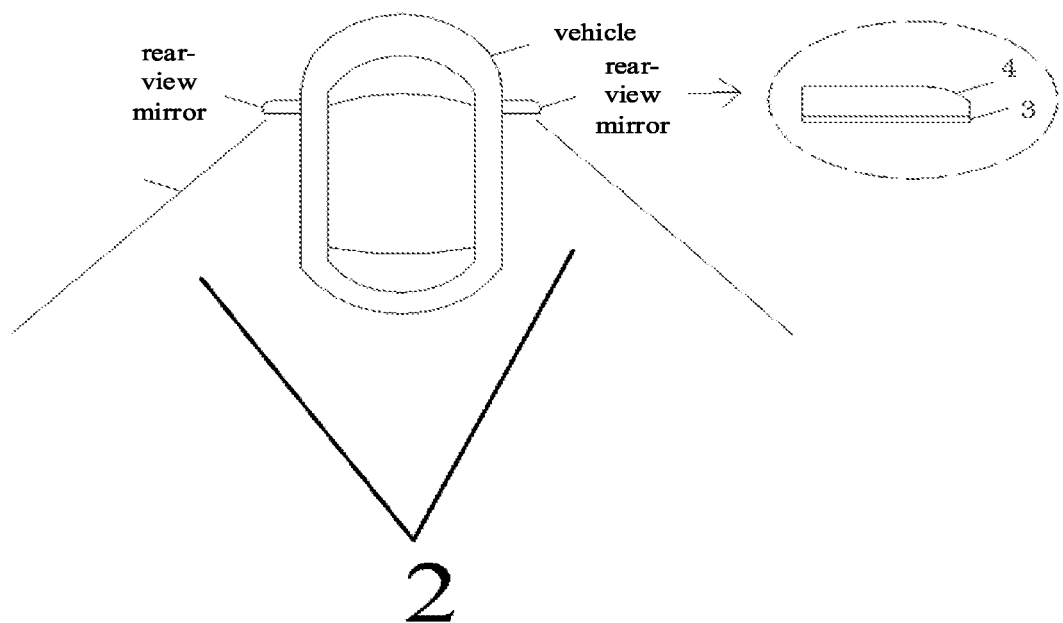
FIG. 5 is a schematic view showing a mirror display of a rear-view panel of a vehicle rear-view mirror in some embodiments of the present disclosure.

In some embodiments of the present disclosure, when the ambient brightness of the position where the vehicle is located is greater than or equal to the first predetermined brightness, the rear-view panel is controlled to perform a specular reflection display, as shown in FIG. 5, the rear-view panel is similar to a one-side reflection mirror like the rear-view mirror of the vehicle in the related art.

In some embodiments of the present disclosure, the method further includes:

in the case that the ambient brightness is smaller than a first predetermined brightness, displaying through the flexible display layer an image of a predetermined region acquired by a camera device.

In some embodiments of the present disclosure, the predetermined region may be an area including a partial appearance of the vehicle, and the range of the predetermined region is smaller than an area corresponding to the viewing angle of the camera device and the number of camera devices, that is, the image of the predetermined region is obtained by zooming out the image acquired by the camera device. The larger the viewing angle of the camera device is and the larger the number of camera devices is, the larger the area of the image acquired by the camera device may be. For example, the area of the image acquired by the camera device may include one or more of: the left side area of the vehicle, the right side area of the vehicle, the rear area of the vehicle, and the front area of the vehicle.

When two or more camera devices are used to acquire images, the images acquired by all the camera devices are jointed together, and then the jointed images are displayed on the flexible display layer.

According to some embodiments of the present disclosure, the image of the predetermined region is acquired by zooming out the image acquired by the camera device and then the image of the predetermined region is displayed on the rear-view panel, so that the driver may timely know conditions of the surrounding environment, thereby enabling the driver to better perceive the surrounding environment.

In some embodiments of the present disclosure, the method further includes:

in the case that the ambient brightness is smaller than a second predetermined brightness, increasing a brightness of the image of the predetermined region acquired by the camera device and displaying the image through the flexible display layer.

According to some embodiments of the present disclosure, in the case that the ambient brightness is smaller than a second predetermined brightness, a brightness of the image displayed by the rear-view panel of the rear-view mirror is increased and then the image is displayed through the flexible display layer, thereby increasing the brightness of the image displayed by the flexible display layer, enabling the driver to better perceive the surrounding environment, improving the traffic safety, and reducing the possibility of the traffic.

In some embodiments of the present disclosure, the method further includes:

in the case that the vehicle is turning, zooming out the image of the predetermined region acquired by the camera device and displaying the image through the flexible display layer.

According to some embodiments of the present disclosure, before detecting that the vehicle is turning, when the image displayed by the flexible display layer is the enlarged one of the image acquired by the camera device, when it is detected that the vehicle is turning, in order to detect the obstacles in the surrounding environment, the image displayed by the flexible display layer is zoomed out, thereby enlarging the range of the image displayed by the flexible display layer, enabling the driver to better perceive the surrounding environment, improving the traffic safety, and reducing the possibility of the traffic.

Figure 11:
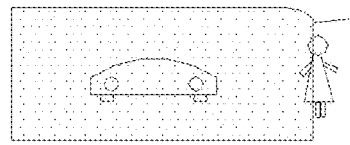
FIG. 11 is a schematic view of an image displayed by a flexible display layer when an ambient brightness of a position where the vehicle is located is smaller than a first predetermined brightness in some embodiments of the present disclosure.
Figure 12:
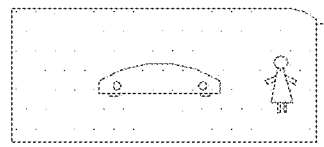
FIG. 12 is a schematic view showing a zoomed out image displayed on a flexible display layer when a vehicle is turning in some embodiments of the present disclosure.

FIG. 11 is a schematic view of an image displayed by a flexible display layer when an ambient brightness of a position where the vehicle is located is smaller than a first predetermined brightness in some embodiments of the present disclosure. As shown in FIG. 11, when the ambient brightness of the position where the vehicle is located is smaller than the first predetermined brightness, the image displayed by the flexible display layer is an image of a predetermined region after the image acquired by the camera device is enlarged. In this case, when the vehicle is turning, the driver may not be able to observe the obstacles outside the predetermined region in time, thereby causing a traffic accident. Therefore, it is necessary to zoom out the image displayed by the flexible display layer, thereby enabling the driver to better perceive the surrounding environment. As shown in FIG. 12, after the image displayed by the flexible display layer is zoomed out, the range of the image displayed by the flexible display layer is enlarged, thereby enlarging the driver's vision field, and the driver may observe the obstacle in the predetermined region in time enabling the driver to better perceive the surrounding environment, improving the traffic safety, and reducing the possibility of the traffic.

Figure 13:
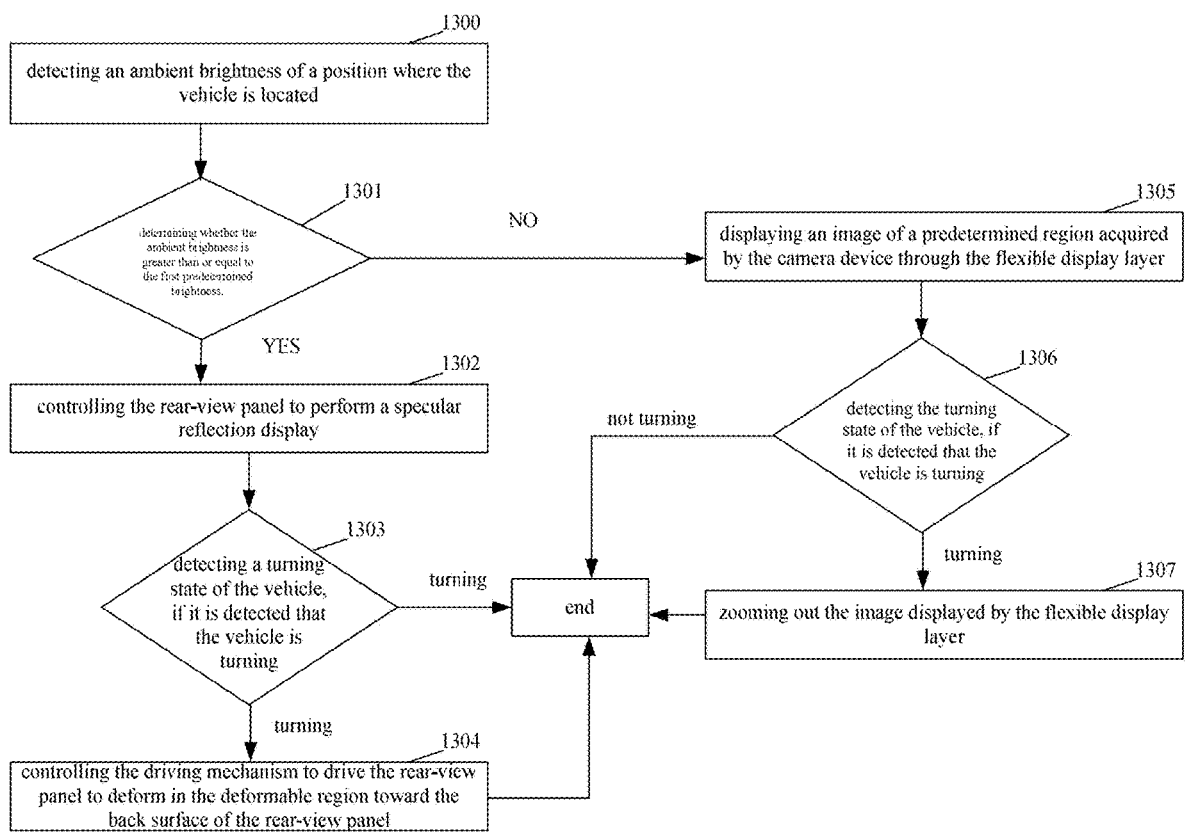
FIG. 13 is a flow chart of a method for controlling a vehicle rear-view mirror in some embodiments of the present disclosure.
Figure 14:
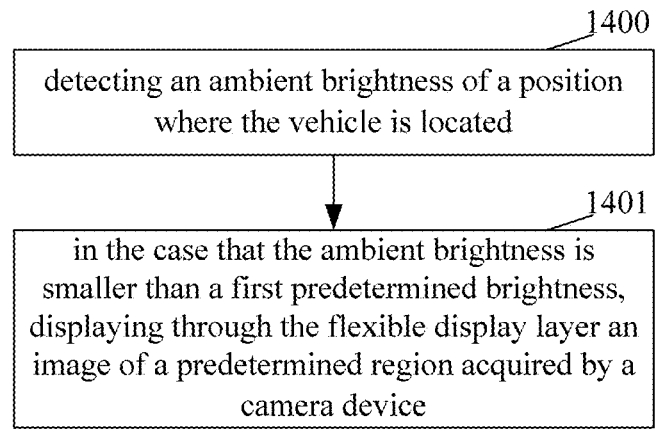
FIG. 14 is a flow chart of a method for controlling a vehicle rear-view mirror in some embodiments of the present disclosure.
Figure 15:
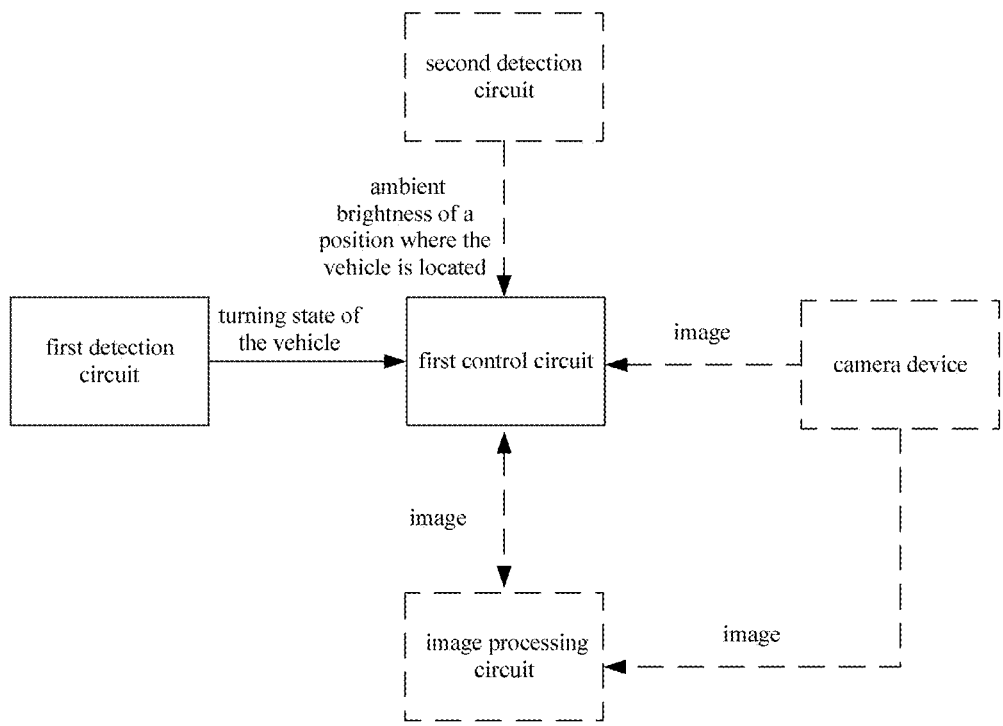
FIG. 15 is a schematic view of a control system of a vehicle rear-view mirror according to a fourth embodiment of the present disclosure.

Referring to FIG. 13, the method includes:

Step 1300: detecting an ambient brightness of a position where the vehicle is located;

Step 1301: determining whether the ambient brightness is greater than or equal to the first predetermined brightness. If yes, the method proceeds to step 1302; if no, the method proceeds to step 1305;

Step 1302: controlling the rear-view panel to perform a specular reflection display;

Step 1303, detecting a turning state of the vehicle, if it is detected that the vehicle is turning, the method proceeds to step 1304; if it is detected that the vehicle is not turning, the process is ended;

Step 1304: controlling the driving mechanism to drive the rear-view panel to deform in the deformable region toward the back surface of the rear-view panel, and then ending the process;

Step 1305: displaying an image of a predetermined region acquired by the camera device through the flexible display layer;

In this step, the image of the predetermined region displayed by the flexible display layer is acquired by enlarging the image acquired by the camera device;

Step 1306: detecting the turning state of the vehicle, if it is detected that the vehicle is turning, the method proceeds to step 1307; if it is detected that the vehicle is not turning, the process is ended;

Step 1307: zooming out the image displayed by the flexible display layer;

FIG. 14 is a flow chart of a method for controlling a vehicle rear-view mirror in some embodiments of the present disclosure. Referring to FIG. 14, the method includes:

Step 1400: detecting an ambient brightness of a position where the vehicle is located;

Step 1401: in the case that the ambient brightness is smaller than a first predetermined brightness, displaying through the flexible display layer an image of a predetermined region acquired by a camera device;

In some embodiments of the present disclosure, the method further includes:

in the case that the ambient brightness is smaller than a second predetermined brightness, increasing a brightness of the image of the predetermined region acquired by the camera device and displaying the image through the flexible display layer;

In some embodiments of the present disclosure, the method further includes: detecting a turning state of the vehicle;

in the case that the vehicle is turning, zooming out the image of the predetermined region acquired by the camera device and displaying the image through the flexible display layer;

FIG. 15 is a schematic view of a control system of a vehicle rear-view mirror according to a fourth embodiment of the present disclosure, the control system includes:

a first detection circuit, configured to detect a turning state of the vehicle;

a first control circuit configured to, in the case that the first detection circuit detects that the vehicle is turning, control the driving mechanism to drive the deformable region of the rear-view panel to deform towards the driving mechanism.

Optionally, the first detection circuit is further configured to:

acquiring a turning direction of the vehicle;

Optionally, the first control circuit is further configured to:

in the case that the first detection circuit detects that the vehicle is turning, control the driving mechanism of the rear-view mirror corresponding to the turning direction of the vehicle to drive the deformable region of the rear-view panel to deform towards the driving mechanism.

In some embodiments of the present disclosure, the first control circuit is further configured to:

in the case that the first detection circuit detects that the vehicle is turning, control the driving mechanism to drive the deformable region of the rear-view panel to deform towards the driving mechanism at a predetermined angle or at an angle corresponding to a turning angle of the vehicle.

Optionally, the first detection circuit is a turning direction sensor.

In some embodiments of the present disclosure, the control system further includes:

a second detecting circuit, configured to detect an ambient brightness of a position where the vehicle is located.

The first control circuit is further configured to:

in the case that the ambient brightness is larger than or equal to the first predetermined brightness, the rear-view panel is controlled to perform a specular reflection display.

In some embodiments of the present disclosure, the second detection circuit is a brightness sensor.

In some embodiments of the present disclosure, the control system further includes: a camera device configured to acquire an image;

The first control circuit is further configured to:

in the case that the ambient brightness is smaller than a first predetermined brightness, display through the flexible display layer an image of a predetermined region acquired by a camera device.

In some embodiments of the present disclosure, the control system further includes an image processing circuit.

The first control circuit is further configured to:

in the case that the ambient brightness is smaller than a second predetermined brightness, increase a brightness of the image of the predetermined region acquired by the camera device and display the image through the flexible display layer.

In some embodiments of the present disclosure, the control system further includes an image processing circuit.

The first control circuit is further configured to:

in the case that the vehicle is turning, zoom out the image of the predetermined region acquired by the camera device and display the image through the flexible display layer.

Figure 16:
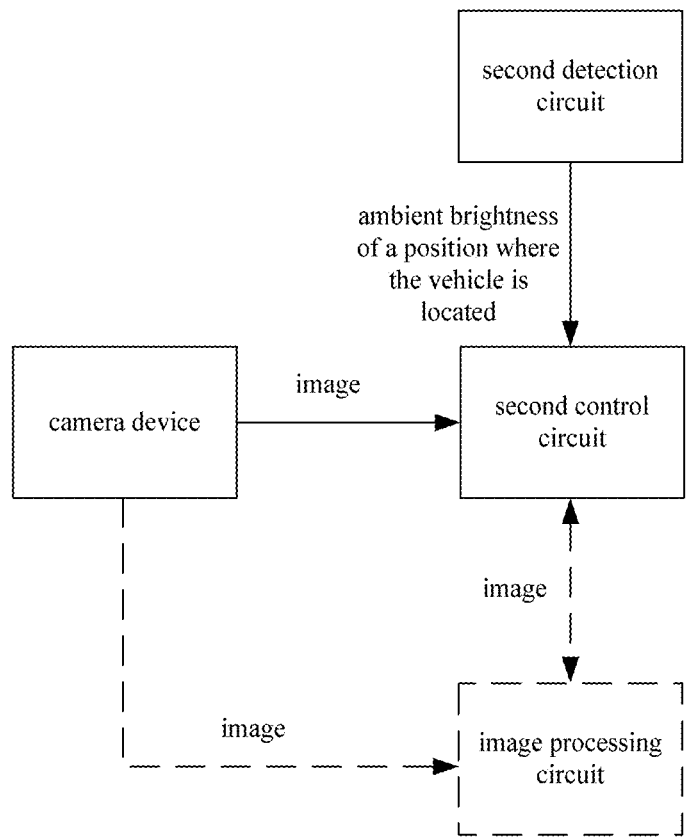
FIG. 16 is a schematic view of a control system of a vehicle rear-view mirror according to a fourth embodiment of the present disclosure.

FIG. 16 is a schematic view of a control system of a vehicle rear-view mirror according to a fourth embodiment of the present disclosure. Referring to FIG. 16, the control system includes:

a second detection circuit, configured to detect an ambient brightness of a position where the vehicle is located;

a camera device, configured to acquire an image of a predetermined region;

and a second control circuit configured to, in the case that the second detection circuit detects that the ambient brightness is smaller than a first predetermined brightness, display through the flexible display layer the image of the predetermined region acquired by the camera device.

In some embodiments of the present disclosure, the control system further includes an image processing circuit.

The second control circuit is further configured to, in the case that the second detection circuit detects that the ambient brightness is smaller than a second predetermined brightness, control the image processing circuit to increase a brightness of the image of the predetermined region acquired by the camera device and display the image through the flexible display layer.

In some embodiments of the present disclosure, the control system further includes: a first detection circuit and an image processing circuit.

The first detection circuit is configured to detect a turning state of the vehicle.

The second control circuit is further configured to, in the case that the first detection circuit detects that the vehicle is turning, control the image processing circuit to zoom out the image of the predetermined region acquired by the camera device and display the image through the flexible display layer.

Figure 17:
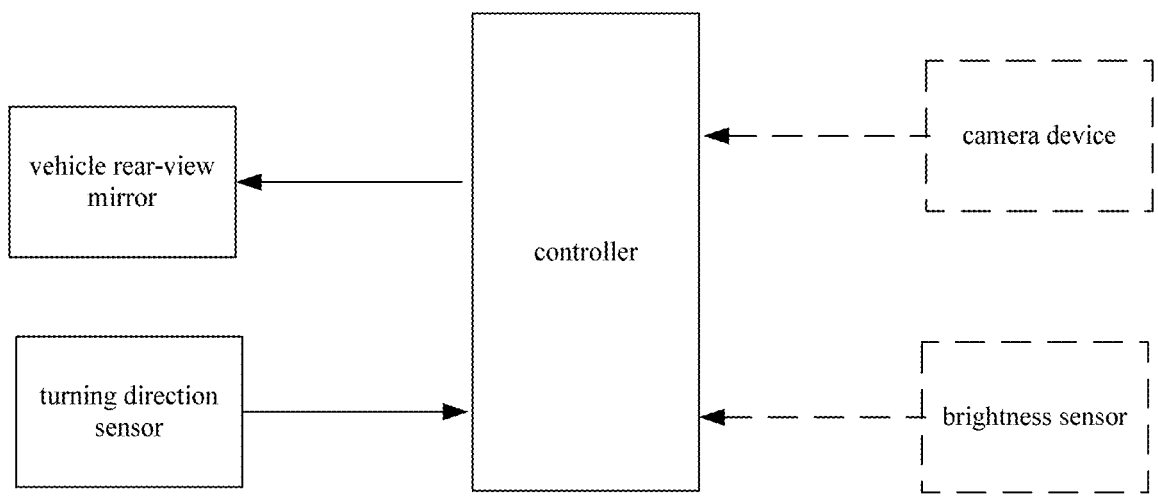
FIG. 17 is a schematic view of a control system of a vehicle rear-view mirror according to a fourth embodiment of the present disclosure.

FIG. 17 is a schematic view of a control system of a vehicle rear-view mirror according to a fourth embodiment of the present disclosure. Referring to FIG. 17, the control system includes the above rear-view mirrors, a controller, a turning direction sensor and a driver.

The turning direction sensor is configured to detect a turning state of the vehicle.

The controller is configured to, in the case that the turning direction sensor detects that the vehicle is turning, control the driving mechanism to drive the deformable region of the rear-view panel to deform towards the driving mechanism.

In some embodiments of the present disclosure, the controller is further configured to:

acquire a turning direction of the vehicle and in the case that the first detection circuit detects that the vehicle is turning, control the driving mechanism of the rear-view mirror corresponding to the turning direction of the vehicle to drive the deformable region of the rear-view panel to deform towards the driving mechanism.

In some embodiments of the present disclosure, the control system further includes:

a brightness sensor configured to detect an ambient brightness of a position where the vehicle is located.

The controller is further configured to:

in the case that the ambient brightness is larger than or equal to the first predetermined brightness, control the rear-view panel of the rear-view mirror to perform the specular reflection display.

In some embodiments of the present disclosure, the control system further includes:

a camera device configured to acquire an image;

The controller is further configured to:

in the case that the ambient brightness is smaller than a first predetermined brightness, display through the flexible display layer an image of a predetermined region acquired by a camera device.

In some embodiments of the present disclosure, the controller is further configured to:

in the case that the ambient brightness is smaller than a second predetermined brightness, increase a brightness of the image of the predetermined region acquired by the camera device and display the image through the flexible display layer.

In some embodiments of the present disclosure, the controller is further configured to:

in the case that the vehicle is turning, zoom out the image of the predetermined region acquired by the camera device and display the image through the flexible display layer.

A computer readable storage medium is further provided in some embodiments of the present disclosure, which stores a computer program which is executable on a processor, the computer program is executed by the processor to implement the steps of the above control methods.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A vehicle rear-view mirror, comprising: a rear-view panel and a driving mechanism, wherein the rear-view panel comprises a flexible base substrate and a flexible specular reflective layer, wherein at least a portion of the rear-view panel is a deformable region, and the flexible specular reflective layer is arranged on the flexible base substrate;

the driving mechanism is configured to drive the rear-view panel to deform;

wherein the rear-view panel further comprises a flexible display layer, and the flexible display layer is arranged between the flexible specular reflective layer and the flexible base substrate;

wherein the flexible specular reflective layer comprises a plurality of reflective units separated apart from each other, and the flexible display layer comprises a plurality of pixel units separated apart from each other;

the reflective units of the flexible specular reflective layer shield the pixel units of the flexible display layer, to reflect an external image; or the pixel units of the flexible display layer are arranged at intervals between adjacent reflective units of the flexible specular reflective layer, to display an external image.

2. The vehicle rear-view mirror according to claim 1, wherein the rear-view panel further comprises a flexible display layer, the flexible specular reflective layer is arranged between the flexible display layer and the flexible base substrate.

3. The vehicle rear-view mirror according to claim 2, wherein the flexible display layer is a transparent layer, and the flexible specular reflective layer is configured to reflect an external image.

4. The vehicle rear-view mirror according to claim 2, wherein the flexible display layer is configured to display an external image.

5. The vehicle rear-view mirror according to claim 1, wherein the rear-view panel further comprises a flexible display layer, and the flexible specular reflective layer is a pixel electrode layer of the flexible display layer.

6. The vehicle rear-view mirror according to claim 1, wherein the deformable region is arranged at a side of the rear-view panel away from a vehicle, and the driving mechanism is configured to drive the rear-view panel to deform towards the driving mechanism.

7. A method for controlling the vehicle rear-view mirror according to claim 1, comprising:

detecting a turning state of the vehicle;

in the case that the vehicle is turning, controlling the driving mechanism to drive the deformable region of the rear-view panel to deform towards the driving mechanism.

8. The method according to claim 7, wherein prior to the controlling the driving mechanism to drive the deformable region of the rear-view panel to deform towards the driving mechanism, the method further comprises: acquiring a turning direction of the vehicle;

the controlling the driving mechanism to drive the deformable region of the rear-view panel to deform towards the driving mechanism further comprises:

controlling the driving mechanism of the rear-view mirror corresponding to the turning direction of the vehicle to drive the deformable region of the rear-view panel to deform towards the driving mechanism.

9. The method according to claim 7, wherein the controlling the driving mechanism to drive the deformable region of the rear-view panel to deform towards the driving mechanism further comprises:

controlling the driving mechanism to drive the deformable region of the rear-view panel to deform towards the driving mechanism at a predetermined angle or at an angle corresponding to a turning angle of the vehicle.

10. A control system of the vehicle rear-view mirror according to claim 1, comprising:

a first detection circuit, configured to detect a turning state of the vehicle;

a first control circuit configured to, in the case that the first detection circuit detects that the vehicle is turning, control the driving mechanism to drive the deformable region of the rear-view panel to deform towards the driving mechanism.

11. The control system according to claim 10, wherein the first detection circuit is further configured to acquire a turning direction of the vehicle;

the first control circuit is further configured to, in the case that the first detection circuit detects that the vehicle is turning, control the driving mechanism of the rear-view mirror corresponding to the turning direction of the vehicle to drive the deformable region of the rear-view panel to deform towards the driving mechanism.

12. The control system according to claim 10, wherein the first control circuit is further configured to, in the case that the first detection circuit detects that the vehicle is turning, control the driving mechanism to drive the deformable region of the rear-view panel to deform towards the driving mechanism at a predetermined angle or at an angle corresponding to a turning angle of the vehicle.

* * * * *